United States Patent
Hashimoto et al.

(10) Patent No.: US 9,002,061 B2
(45) Date of Patent: Apr. 7, 2015

(54) IMAGE PROCESSING DEVICE, IMAGE PROCESSING METHOD AND COMPUTER-READABLE MEDIUM

(71) Applicant: Casio Computer Co., Ltd., Shibuya-ku, Tokyo (JP)

(72) Inventors: Shogo Hashimoto, Kawasaki (JP); Akira Hamada, Sagamihara (JP); Yoshihiro Teshima, Higashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 259 days.

(21) Appl. No.: 13/764,372

(22) Filed: Feb. 11, 2013

(65) Prior Publication Data

US 2013/0230209 A1    Sep. 5, 2013

(30) Foreign Application Priority Data

Mar. 2, 2012  (JP) ................................ 2012-046743

(51) Int. Cl.
G06K 9/00    (2006.01)
G06T 9/00    (2006.01)

(52) U.S. Cl.
CPC ...................................... *G06T 9/00* (2013.01)

(58) Field of Classification Search
None
See application file for complete search history.

(56) References Cited

U.S. PATENT DOCUMENTS

| 8,326,037 B1 * | 12/2012 | Abitz et al. .................. 382/181 |
| 8,831,285 B2 * | 9/2014 | Kang .............. 382/103 |
| 2008/0100620 A1 * | 5/2008 | Nagai et al. .................. 345/424 |
| 2012/0050326 A1 * | 3/2012 | Tanaka .......................... 345/633 |

FOREIGN PATENT DOCUMENTS

JP            07-057080 A    3/1995

* cited by examiner

*Primary Examiner* — Nancy Bitar
(74) *Attorney, Agent, or Firm* — Holtz, Holtz, Goodman & Chick PC

(57) ABSTRACT

The present invention improves the recognition rate of an augmented reality marker and the processing speed thereof, simultaneously. In the present invention, a CPU binarizes actual image captured in an image sensor in accordance with an adaptive thresholding, and detects an augmented reality marker from within the binarized image. Then, the CPU determines a binarization threshold based on the augmented reality marker, and after binarizing the actual image captured in the image sensor in accordance with a fixed threshold binarization method using the binarization threshold, recognizes the augmented reality marker based on the binarized image.

16 Claims, 5 Drawing Sheets

IMAGE PROCESSING DEVICE, IMAGE PROCESSING METHOD AND COMPUTER-READABLE MEDIUM

CROSS-REFERENCE TO RELATED APPLICATION

This application is based upon and claims the benefit of priority from the prior Japanese Patent Application No. 2012-046743, filed Mar. 2, 2012, the entire contents of which is incorporated herein by reference.

BACKGROUND OF THE INVENTION

1. Field of the Invention

The present invention relates to an image processing device, an image processing method, and a computer-readable medium by which an augmented reality marker within a captured image is recognized.

2. Description of the Related Art

Mobile terminal devices, such as smartphones, are becoming increasingly multifunctional, and generally have an image processing function referred to as Augmented Reality (AR), in addition to a camera function (imaging function). In this function, a virtual image (such as a character image) is displayed in a predetermined area within a captured image by image composition. Specifically, when a photographic subject is captured by the imaging function with an AR marker composed of printed material (a marker on which a white pattern is drawn within a square black frame) being arranged at or near the position of the subject, the mobile terminal device recognizes the AR marker included in the captured image by analyzing the captured image, and displays a virtual image on the area of the AR marker by image composition. In this processing, in order to recognize the AR marker, the mobile terminal device converts the captured image to, for example, a gray scale image, and binarizes it using an adaptive thresholding. This technology to binarize an image using an adaptive thresholding is described in, for example, Japanese Patent Application Laid-open (Kokai) Publication No. 07-057080.

In this technology to binarize an image using adaptive thresholding, binarization processing on a captured image is performed for each frame. However, this processing is too CPU-intensive for mobile terminal devices such as smartphones. Therefore, there is a problem in that processing speed becomes slow and AR markers cannot be smoothly recognized.

This problem may be solved by binarizing captured images by a fixed threshold binarization method using a fixed binarization threshold. However, in this configuration, because a binarization threshold for the entire captured image is calculated, the calculation of an optimal binarization threshold within an AR marker becomes difficult. Accordingly, there is a problem in that, although processing speed is high, recognition rate is low.

SUMMARY OF THE INVENTION

An object of the present invention is to improve the recognition rate and the processing speed of augmented reality markers simultaneously.

In accordance with one aspect of the present invention, there is provided an image processing device comprising: an imaging section equipped with an image sensor; a first binarization section which performs processing to binarize an actual image captured in the image sensor in accordance with an adaptive thresholding; a first detecting section which detects an augmented reality marker from within the actual image binarized by the first binarization section; a threshold determining section which determines a binarization threshold based on the augmented reality marker detected by the first detecting section; a second binarization section which performs processing to binarize the actual image captured in the image sensor in accordance with a fixed threshold binarization method using the binarization threshold, after the binarization threshold is determined by the threshold determining section; and a second detecting section which detects the augmented reality marker based on the actual image binarized by the second binarization section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of the present invention will hereinafter be described with reference to FIG. 1 to FIG. 4.

Figure 1:
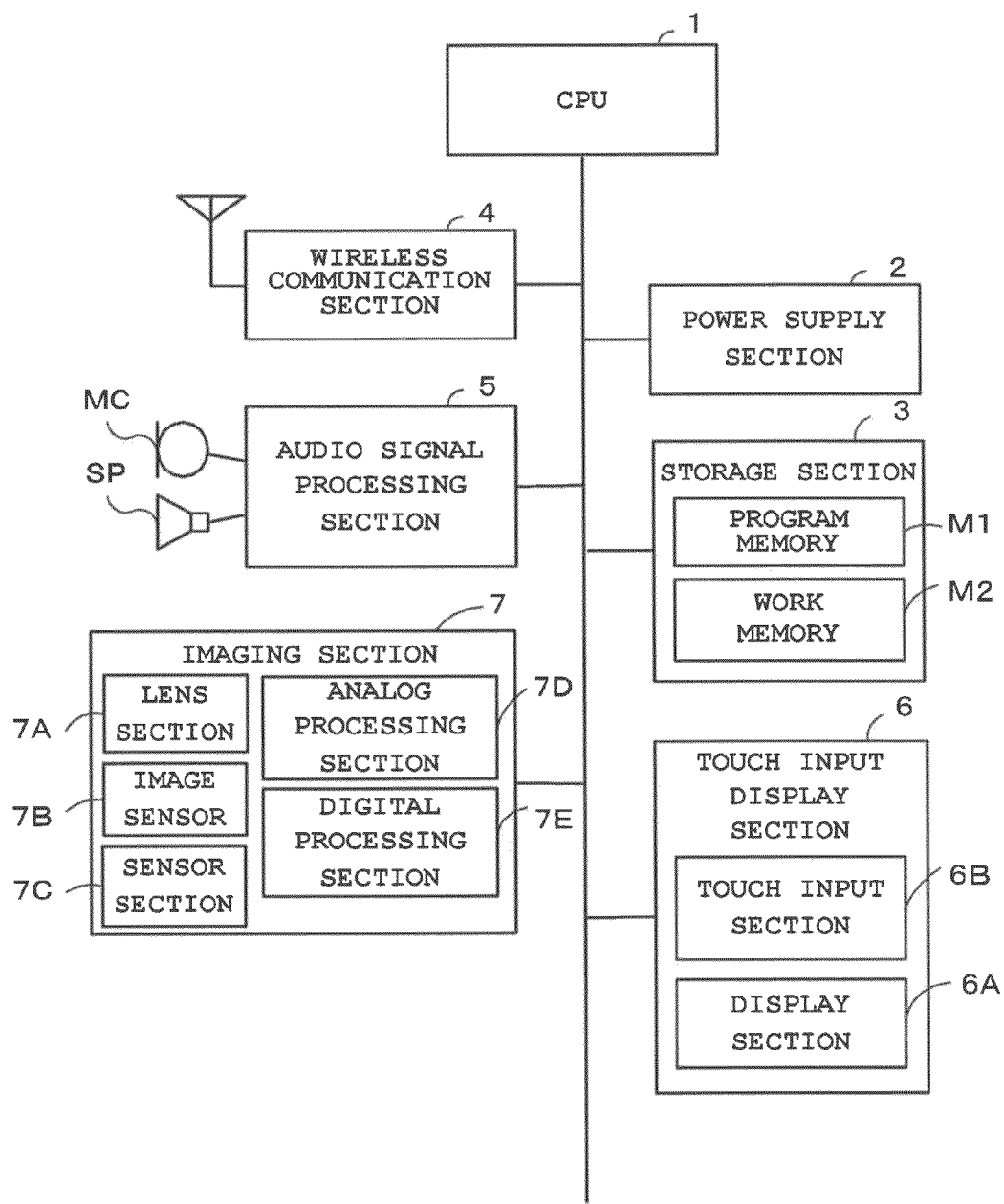
FIG. 1 is a block diagram showing basic components of a multifunctional mobile phone (smartphone) having a camera function, in which the present invention has been applied as an image processing device.

The present embodiment is a multifunctional mobile phone (smartphone) having a camera function, in which the present invention has been applied as an image processing device. FIG. 1 is a block diagram showing basic components of the multifunctional mobile phone having a camera function.

This multifunctional mobile phone has an augmented reality processing function for combining a predetermined virtual image (such as a character image) with an image captured by a camera function and thereby displaying it within the captured image, in addition to its basic functions such as a call function, an electronic mail function, an Internet connection function, and the camera function.

A Central Processing Unit (CPU) 1 in FIG. 1 operates by receiving power from a power supply section 2 equipped with a secondary battery (not shown), and controls the overall operation of the mobile phone in accordance with various programs stored in a storage section 3. The storage section 3 includes a program memory M1 and a work memory M2. The program memory M1 stores programs for actualizing the present embodiment based on operation procedures shown in FIG. 3, various applications, and information required by these programs and applications. The work memory M2 is a work area that temporarily stores various information required to operate the mobile phone (such as information regarding a captured image, a flag, or a timer). Note that the storage section 3 may be, for example, structured to include a detachable portable memory (recording media) such as a Secure Digital (SD) card or an Integrated Circuit (IC) card. Alternatively, the storage section 3 may be structured to be partially provided on a predetermined external server (not shown).

A wireless communication section 4 in FIG. 1 is a wide-range communication section used for the call function, the electronic mail function, and the Internet connection function. When the call function is running, the wireless communication section 4 outputs audio from a call speaker SP via, an audio signal processing section 5. In addition, it loads audio data inputted from a call microphone MC from the audio signal processing section 5, and transmits and outputs this audio data from an antenna. A touch input display section 6 in FIG. 1 includes a display panel 6A and a touch input section 6B, in which the touch input section 6B is arranged on the front surface of the high-definition display panel 6A, whereby software keys (touch keys) are allocated and arranged. This touch input display section 6 displays function names, or senses a touch operation performed by a finger or the like and inputs data based on the touch operation. The display section 6A is a high-definition liquid crystal display, an organic Electraluminescent (EL) display, or the like having a screen where the aspect ratio (4:3 [width to height]) differs. When the camera function is running, the display section 6A serves as a viewfinder screen that displays a captured image as a live-view image (monitor image).

An imaging section 7 in FIG. 1 constitutes a camera section capable of capturing a photographic subject in high definition, and includes a lens section 7A equipped with a zoom lens and a focus lens (not shown), an image sensor 7B such as a Charge-Coupled. Device (CCD) or a Complementary Metal Oxide Semiconductor (CMOS), a sensor section 7C equipped with various sensors such as an illuminometer, an analog processing circuit 7D that performs color separation and gain adjustment for each RGB color component on image signals (analog value signals) photoelectrically converted by the image sensor 7B and converts them to digital value data, and a digital signal processing circuit 7E that performs color interpolation processing (de-mosaic processing) and the like on image data digitalized by the analog processing circuit 7D.

In the present embodiment, the imaging mode is switchable to various types of modes, such as a nightscape imaging mode, a sunset imaging mode, and an augmented reality imaging mode. In the augmented reality imaging mode, image capturing is performed using the augmented reality processing function. When the current mode is switched to the augmented reality imaging mode, an Auto Focus (AF) adjustment function, an Auto Exposure (AE) adjustment function, and an Auto White Balance (AWB) adjustment function are activated. Note that, although the contrast AF method has been adopted for the AF function in the present embodiment, the phase-difference AF may be adopted instead. In addition, the method for the AE function is not limited to a method in which surrounding brightness is detected, and may be a method in which luminance is detected based on image data.

Figure 2:
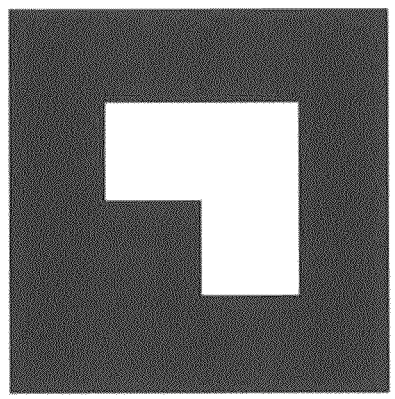
FIG. 2 is a diagram showing an example of an AR marker used in augmented reality processing.

FIG. 2 is a diagram showing an example of an AR marker used in the augmented reality processing.

This AR marker is, for example, printed material on which a pattern composed of a white area having a random shape is drawn within a square black frame, and of which the black area and the white area have a predetermined proportion.

When an AR marker created as described above is arranged on or near a target photographic subject, and the photographic subject is captured by the imaging section 7 in this state, the CPU 1 analyzes the image (actual image) captured in the image sensor 7B, focuses on the black frame portion of the AR marker in the image, and thereby detects the area of the AR marker (the area of the black frame). Then, the CPU 1 identifies the pattern of the white area drawn within the black frame portion, and thereby detects the AR marker.

In the present embodiment, until an AR marker is detected from an actual image captured in the image sensor 7B, the actual image is analyzed and binarization processing in accordance with an adaptive thresholding is performed for each frame. When the AR marker is detected, the binarization threshold is determined based on the area of the detected AR marker, binarization processing in accordance with a fixed threshold binarization method is performed on the AR marker using the binarization threshold, and the AR marker is recognized while being tracked. Then, at the position of the AR marker recognized thereby, a predetermined virtual image (such as a character image) is displayed by image composition.

Figure 3:
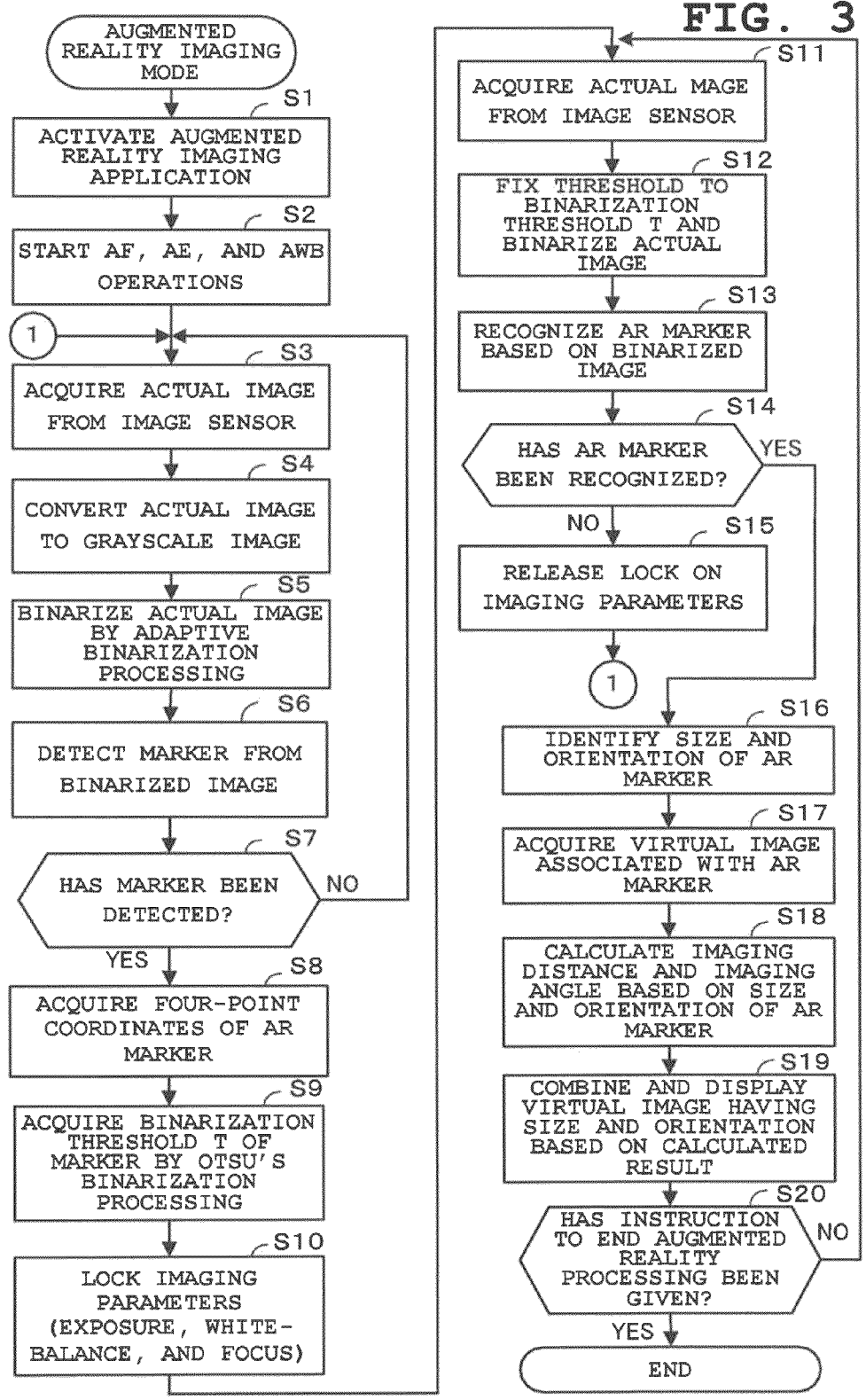
FIG. 3 is a flowchart for describing the augmented reality processing which is started when an operating mode is switched to an augmented reality imaging mode.

Next, the operational concept of the multifunctional mobile phone according to the present embodiment will be described with reference to the flowchart shown in FIG. 3. Here, each function described in the flowchart is stored in a readable program code format, and operations based on these program codes are sequentially performed. Also, operations based on the above-described program codes transmitted over a transmission medium such as a network can also be sequentially performed. Note that FIG. 3 is a flowchart outlining operations of the characteristic portion of the first embodiment from among all of the operations of the multifunctional mobile phone. After exiting the flow in FIG. 3, the procedure returns to the main flow (not shown) of the overall operation.

The flowchart of FIG. 3 describes the augmented reality processing that is started when the imaging mode is switched to the augmented reality imaging mode.

First, when the current mode is switched to the augmented reality imaging mode by a user operation or the like, the CPU 1 activates an augmented reality imaging application (Step S1), and starts the operations of the AF adjustment function, the AR adjustment function, and the AWB adjustment function (Step S2). Next, the CPU 1 acquires an image (actual image) captured in the image sensor 7B (Step S3), and after converting it to a grayscale image based on the brightness (Step S4), performs binarization processing in accordance with the adaptive thresholding on this grayscale image (Step S5). Then, the CPU 1 performs processing to detect an AR marker based on the binarized image (Step S6). In this instance, the CPU 1 detects, for example, a square black frame as the area of an AR marker.

Next, the CPU 1 judges whether or not an AR marker has been detected as a result (Step S7). When judged that an AR marker has not been detected (NO at Step S7), the CPU 1 returns to above-described Step S3, and after acquiring an actual image of the next frame captured in the image sensor 7B, converts it to a grayscale image (Step S4), and performs binarization processing in accordance with the adaptive thresholding on this grayscale image (Step S5). Hereafter, until the area of an AR marker is detected, the CPU 1 repeats the above-described processing on each frame while acquiring actual images captured in the image sensor 7B.

Figure 4:
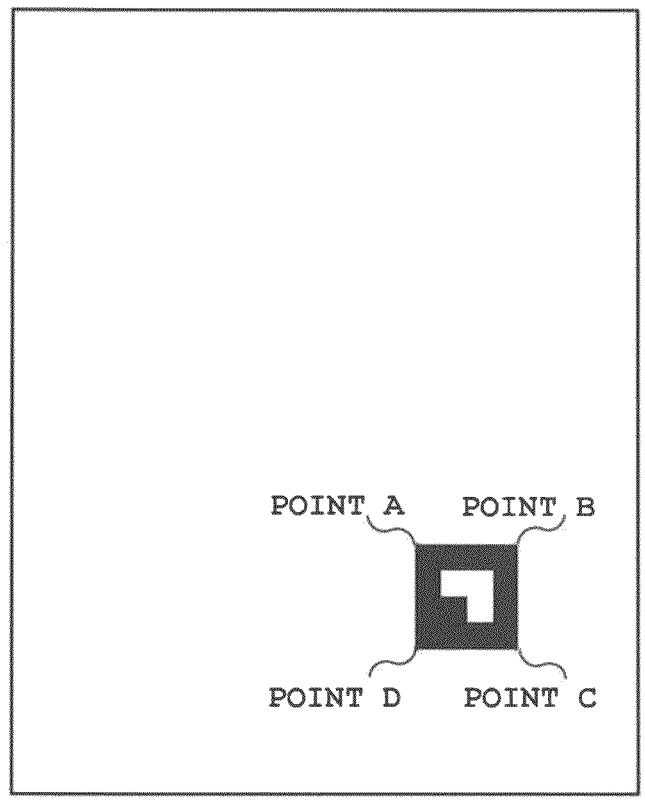
FIG. 4 is a diagram showing four-point coordinates used to identify the area of a detected AR marker.

At Step S7, when judged that an AR marker has been detected (YES at Step S7), the CPU 1 acquires the four-point coordinates of the area of the AR marker based on the detected marker (Step S8), FIG. 4 is a diagram showing four-point coordinates used to identify a detected AR marker. At Step S8, the corner portions A, B, C, and D of the square of the black frame are determined as the four-point coordinates of the area of the AR marker. When the area of the AR marker within the binarized image is identified based on the four-point coordinates A, B, C, and D, the CPU 1 calculates a binarization threshold T within the area of the AR marker, using Otsu's binarization method within the identified area of the AR marker (Step S9). In Otsu's binarization method in this instance, the CPU calculates and acquires, as the binarization threshold T, a threshold where within-class variance is minimized and between-class variance is maximized, with reference to within-class variance and between-class variance within the area of the AR marker. Then, the CPU 1 locks the AF, AE, and AWB adjustment functions to fix imaging parameter values (focus, exposure, and white-balance) acquired by the AF, AE, and AWB adjustment functions (Step S10).

After the area of the AR marker is detected as described above, the CPU 1 acquires an actual image captured in the image sensor 7B (Step S11), and after performing binarization processing in accordance with the fixed threshold binarization method on the acquired actual image using the binarization threshold T (Step S12), performs processing to recognize the AR marker based on the binarized image (Step S13). In this instance, the CPU 1 recognizes the AR marker by identifying the pattern of the white area drawn within the AR marker. When the AR marker cannot be recognized (NO at Step S14), the CPU 1 releases the lock on the AF, AE, and AWB adjustment functions, or in other words, releases the imaging parameter values (focus, exposure and white-balance) from being fixed (Step S15). Then, the CPU 1 returns to above-described Step S3, acquires an actual image of the next frame, and resumes the binarization processing in accordance with the adaptive thresholding for each frame.

Conversely, when the AR marker is successfully recognized (YES at Step S14), the CPU 1 identifies the size and orientation of the AR marker by image analysis (Step S15) and acquires a virtual image (such as a character image) associated with the recognized AR marker (Step S16). Note that, in a case where virtual images associated with the types of AR markers have been stored in the storage section 3, the CPU 1 reads out and acquires the virtual image associated with the type of the AR marker recognized as described above from the storage section 3.

Next, the CPU 1 calculates an imaging distance and an imaging angle (imaging direction) based on the size and orientation of the AR marker (Step S18), and after generating a virtual image having the size and orientation based on the calculated results (calculated imaging distance and imaging angle), superimposes the generated image (virtual image) onto the position of the AR marker within the actual image, and displays the virtual image within the actual image by image composition (Step S19). Subsequently, the CPU 1 judges whether or not an instruction to end the augmented reality processing has been given by a user operation (Step S20). When judged that an end instruction has been given (YES at Step S20), the CPU 1 exits the flow in FIG. 3. Conversely, when fudged that an instruction to end the augmented reality processing has not been given (NO at Step S20), the CPU 1 returns to above-described Step S11. Hereafter, the CPU 1 repeats an operation to acquire an actual image captured in the image sensor 7B, perform binarization processing in accordance with the fixed threshold binarization method (Step S12), and recognize an AR marker based on the binarized image (Step S13). During this composition and display of the virtual image, when judged that the AR marker is no longer recognized (ND at Step S14) and cannot be found, the CPU 1 releases the lock on the imaging parameters (Step S15), and returns to above-described Step S3 to resume the adaptive binarization processing.

As described above, in the present embodiment, the CPU 1 binarizes an actual image captured in the image sensor 7 in accordance with the adaptive thresholding, and after detecting an AR marker from within the binarized image, determines a binarization threshold based on the AR marker. Then, the CPU 1 binarizes an actual image captured in the image sensor 7 in accordance with the fixed threshold binarization method using the binarization threshold, and recognizes the AR marker based on the binarized image. That is, the present embodiment has the advantages of both the adaptive thresholding and the fixed threshold binarization method, and therefore is practically useful in that it can improve processing speed while retaining the recognition rate of AR markers.

Also, when consecutively detecting an AR marker for each frame, the CPU 1 detects the AR marker by the binarization of an actual image in accordance with the adaptive thresholding, and then start detecting the AR marker of the subsequent frames by binarization in accordance with the fixed threshold binarization method. That is, the binarization methods can be switched in frame units.

Moreover, in the determination of a binarization threshold based on an AR marker, a threshold where within-class variance is minimized and between-class variance is maximized is determined as the binarization threshold, with reference to within-class variance and between-class variance within the area of the AR marker. As a result of this configuration, a binarization threshold optimal for an AR marker is calculated.

Furthermore, when the binarization threshold T is calculated while the AWB adjustment function, the AE adjustment function, and the AWB adjustment function are running, the imaging parameters (focus, exposure, and white-balance) at the time are maintained and thereby locked (fixed). As a result, the area of the AR marker becomes clear, whereby the marker recognition rate is further improved.

Still further, when an AR marker is no longer detected during the detection thereof in the fixed threshold binarization method, binarization processing in accordance with the adaptive thresholding is resumed and the lock on imaging parameters is released. That is, until the AR marker is recognized, the processing is repeatedly restarted.

Yet still further, when an AR marker is no longer detected in a display operation where a virtual image is displayed by image composition on the area of an AR marker within an actual image for each frame, the display operation is discontinued and binarization processing in accordance with the adaptive thresholding is resumed. That is, the processing is restarted from the beginning when an AR marker is lost after being detected.

Figure 5:
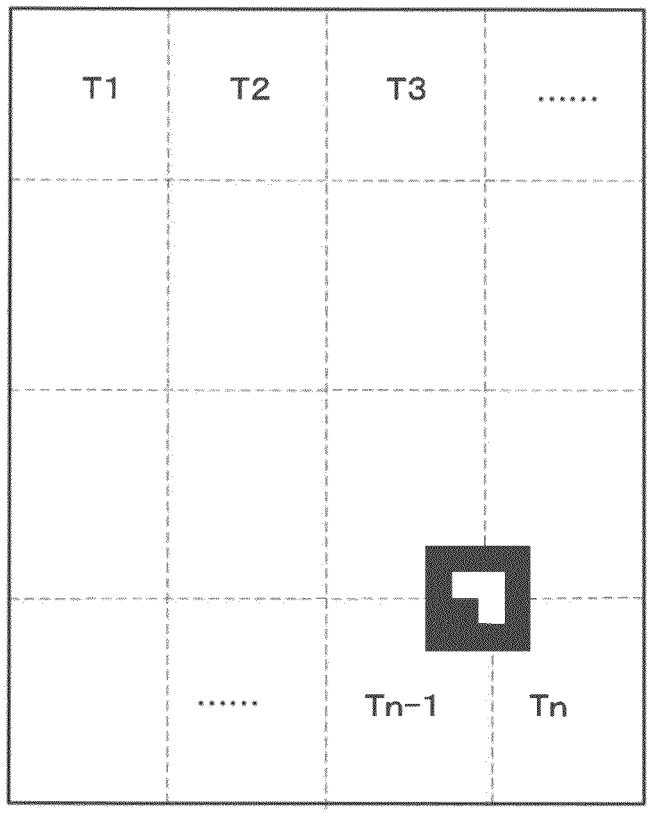
FIG. 5 is a diagram showing a variation example of the present embodiment, which is used to describe an instance where the mean value of thresholds acquired by adaptive binarization processing is calculated as a binarization threshold.

In the above-described embodiment, the binarization threshold T within the area of an AR marker is calculated using Otsu's binarization method. However, a mean value of thresholds acquired by the adaptive binarization processing within the area of an AR marker may be calculated as the binarization threshold T. FIG. 5 is a diagram showing an example where the mean value of thresholds acquired by the adaptive binarization processing is calculated as the binarization threshold T. In this configuration, the entire actual image captured in the image sensor 7B is divided into a plurality of small areas (such as square areas), and the mean value of thresholds T1, T2, T3, . . . Tn for each area within the area of the AR marker is calculated as the binarization threshold T.

Also, in the above-described embodiment, the binarization processing in accordance with the fixed threshold binarization method is started when the area of an AR marker (a black frame) is detected. However, it may be started when an AR marker is detected (recognized).

Moreover, the binarization threshold T may be determined by weighted average by weighting within the area of an AR marker (Gaussian weighting). That is, any method may be used as long as it can calculate an optimal binarization threshold T within the area of an AR marker.

Furthermore, in the above-described embodiment, when the binarization threshold T is calculated, the imaging parameters at the time are locked. However, a configuration may be adopted in which imaging parameters are locked when an AR marker is detected.

Still further, in the above-described embodiment, the present invention has been applied to a multifunctional mobile phone (smartphone) having a camera function. However, the present invention is not limited thereto and may be applied to, for example, a personal computer, a personal digital assistant (PDA), a music player, or an electronic gaming device having a camera function, as well as a digital camera itself.

Yet still further, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An image processing device comprising:
  an imaging section equipped with an image sensor;
  a first binarization section which performs processing to binarize an actual image captured in the image sensor in accordance with an adaptive thresholding;
  a first detecting section which detects an augmented reality marker from within the actual image binarized by the first binarization section;
  a threshold determining section which determines a binarization threshold based on the augmented reality marker detected by the first detecting section;
  a second binarization section which performs processing to binarize the actual image captured in the image sensor in accordance with a fixed threshold binarization method using the binarization threshold, after the binarization threshold is determined by the threshold determining section; and
  a second detecting section which detects the augmented reality marker based on the actual image binarized by the second binarization section.

2. The image processing device according to claim 1, wherein the second detecting section detects the augmented reality marker in frames subsequent to a frame where the augmented reality marker has been detected by the first detecting section, when the augmented reality marker within the actual image is being detected consecutively for each frame.

3. The image processing device according to claim 1, wherein the threshold determining section determines a threshold where within-class variance is minimized and between-class variance is maximized as the binarization threshold, with reference to within-class variance and between-class variance within area of the augmented reality marker detected by the first detecting section.

4. The image processing device according to claim 2, wherein the threshold determining section determines a threshold where within-class variance is minimized and between-class variance is maximized as the binarization threshold, with reference to within-class variance and between-class variance within area of the augmented reality marker detected by the first detecting section.

5. The image processing device according to claim 1, wherein the threshold determining section divides the actual image captured in the image sensor into a plurality of small areas, and determines a mean value of thresholds determined for each area within the augmented reality marker as the binarization threshold.

6. The image processing device according to claim 2, wherein the threshold determining section divides the actual image captured in the image sensor into a plurality of small areas, and determines a mean value of thresholds determined for each area within the augmented reality marker as the binarization threshold.

7. The image processing device according to claim 1, further comprising:
  an imaging parameter adjusting section which performs imaging while adjusting imaging parameters based on imaging conditions when imaging is performed by the imaging section,
  wherein the imaging parameter adjusting section maintains, when the augmented reality marker is detected by the first detecting section, the imaging parameters at time of detection.

8. The image processing device according to claim 2, further comprising:
  an imaging parameter adjusting section which performs imaging while adjusting imaging parameters based on imaging conditions when imaging is performed by the imaging section,
  wherein the imaging parameter adjusting section maintains, when the augmented reality marker is detected by the first detecting section, the imaging parameters at time of detection.

9. The image processing device according to claim 7, wherein the first binarization section resumes the binarization processing in accordance with the adaptive thresholding, and the imaging parameter adjusting section releases the imaging parameters from being fixed, when the augmented reality marker is not detected by the second detecting section.

10. The image processing device according to claim 8, wherein the first binarization section resumes the binarization processing in accordance with the adaptive thresholding, and the imaging parameter adjusting section releases the imaging parameters from being fixed, when the augmented reality marker is not detected by the second detecting section.

11. The image processing device according to claim 7, wherein the imaging parameter adjusting section adjusts at least one of white-balance, exposure, and focus.

12. The image processing device according to claim 8, wherein the imaging parameter adjusting section adjusts at least one of white-balance, exposure, and focus.

13. The image processing device according to claim 1, further comprising:
  a composite display section which combines a predetermined virtual image with the actual image captured by the imaging section, and displays the predetermined virtual image on area of the augmented reality marker detected by the second detecting section; and a control section which, when the augmented reality marker is no longer detected by the second detecting section during a display operation where the composite display section displays the virtual image on the area of the augmented reality marker within an actual image for each frame, discontinues the display operation by the composite display section and resumes the binarization processing by the first binarization section.

14. The image processing device according to claim 2, further comprising:
   a composite display section which combines a predetermined virtual image with the actual image captured by the imaging section, and displays the predetermined virtual image on area of the augmented reality marker detected by the second detecting section; and
   a control section which, when the augmented reality marker is no longer detected by the second detecting section during a display operation where the composite display section displays the virtual image on the area of the augmented reality marker within an actual image for each frame, discontinues the display operation by the composite display section and resumes the binarization processing by the first binarization section.

15. An image processing method comprising;
   a first binarization step of performing processing to binarize an actual image captured in an image sensor in accordance with an adaptive thresholding;
   a first detecting step of detecting an augmented reality marker from within the actual image binarized in accordance with the adaptive thresholding;
   a threshold determining step of determining a binarization threshold based on the detected augmented reality marker;
   a second binarization step of performing processing to binarize the actual image captured in the image sensor in accordance with a fixed threshold binarization method using the binarization threshold, after the binarization threshold is determined; and
   a second detecting step of detecting the augmented reality marker based on the actual image binarized in accordance with the fixed threshold binarization method.

16. A non-transitory computer-readable storage medium having stored thereon a program that is executable by a computer, the program being executable by the computer to perform functions comprising:
   first binarization processing for binarizing an actual image captured in an image sensor in accordance with an adaptive thresholding;
   first detection processing for detecting an augmented reality marker from within the actual image binarized in accordance with the adaptive thresholding;
   threshold determining processing for determining a binarization threshold based on the detected augmented reality marker;
   second binarization processing for binarizing the actual image captured in the image sensor in accordance with a fixed threshold binarization method using the binarization threshold, after the binarization threshold is determined; and
   second detecting processing for detecting the augmented reality marker based on the actual image binarized in accordance with the fixed threshold binarization method.

* * * * *